Figure 5:
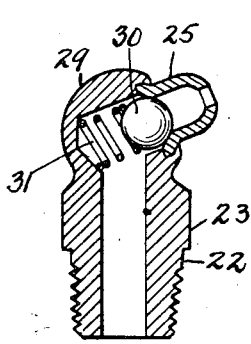

Jan. 3, 1928.
O. U. ZERK
1,655,213
LUBRICATING APPARATUS
Filed April 11, 1924    2 Sheets-Sheet 1
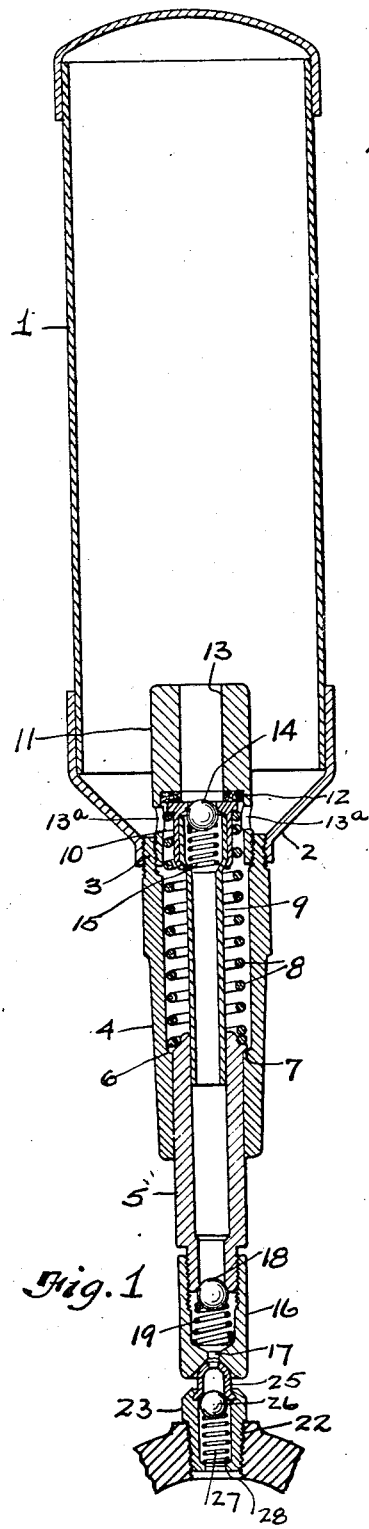
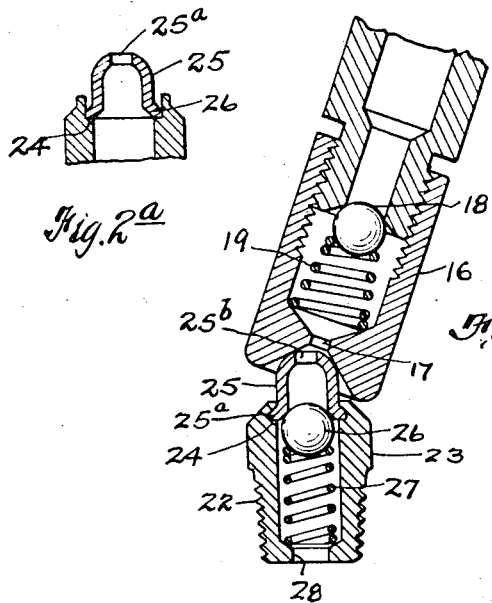
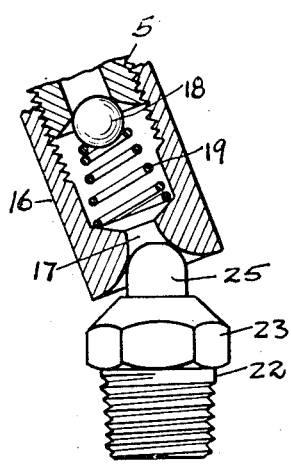
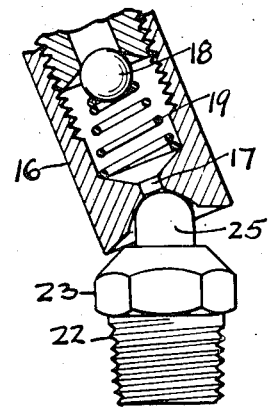
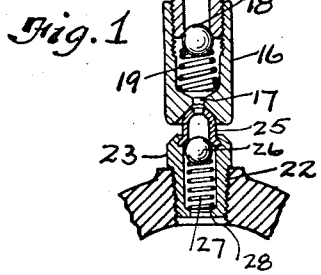
INVENTOR.
Oscar U. Zerk
BY Earl X Pierce
ATTORNEY.

Jan. 3, 1928.  1,655,213

O. U. ZERK

LUBRICATING APPARATUS

Filed April 11, 1924  2 Sheets-Sheet 2

INVENTOR.
Oscar U. Zerk.
BY Earl L. Pierce
ATTORNEY

Patented Jan. 3, 1928.

1,655,213

UNITED STATES PATENT OFFICE.

OSCAR U. ZERK, OF CLEVELAND, OHIO, ASSIGNOR TO BASSICK MANUFACTURING COMPANY, OF CHICAGO, ILLINOIS, A CORPORATION OF DELAWARE.

LUBRICATING APPARATUS.

Application filed April 11, 1924. Serial No. 705,814.

The present improvements, relating, as indicated, to lubricating apparatus, have more particular regard to devices designed for use in lubricating systems such as are generally employed in connection with automobiles and the like, wherein the bearings requiring lubrication are fitted with suitable connections or nipples and the lubricant is supplied to these under pressure from a portable container. In systems of this type, the preferred arrangement is one in which automatic sealing contact with the nipple is obtained by pressing the nozzle of the lubricant discharging device against the nipple, particularly where the forcible discharge of the lubricant is effected incidentally to pressing the nozzle against the nipple.

The object of the present invention is to provide an improved construction of nipple for use in the relation stated above, or other similar uses, the nipple being designed, as indicated, for automatic sealing contact with a nozzle of special form. It is necessary that the nipple should be simple in construction and not likely to get out of order; also that it should be durable and not readily subject to damage so as to destroy the possibility of good sealing contact with the nozzle. Cost of manufacture is also an important item in a device of this sort since a considerable number of nipples is required in the case of a single automobile, and in any machine where this system of lubrication is employed, there will ordinarily be a considerable number of bearings, each of which requires to be provided with a nipple.

To the accomplishment of the foregoing and related ends, the invention, then, consists of the means hereinafter fully described and particularly pointed out in the claims, the annexed drawings and the following description setting forth in detail certain mechanism embodying the invention, the disclosed means constituting, however, but one of various mechanical forms in which the principle of the invention may be used.

In said annexed drawings:—

Fig. 1 is a central longitudinal section of one form of my improved nipple, the same being shown in co-operative relation with a lubricant discharging device of the type hereinbefore referred to; Fig. 2 is a view similar to that of Fig. 1, but on a larger scale, the nozzle only of the discharge device being shown; Fig. 2ª shows the parts of the nipple as they appear in Fig. 2 but in a partially assembled stage; Figs. 3 and 4 are side elevational views of my improved nipple showing nozzles of slightly different forms in sealing contact therewith; and Figs. 5 to 11, inclusive, are central sectional views, showing various modifications in the construction of my improved nipple.

The lubricant discharging device illustrated in Fig. 1 is to be regarded merely as typical, so far as the present case is concerned, such novel features of construction as may be embodied therein being reserved for a separate application. Essentially the device comprises a sealed container 1, preferably of general cylindrical form and having its head or cap 2 formed with an internally threaded bore 3 for the reception of the lubricant discharging device proper. The several parts composing the device are carried in or by a tubular shell 4 threaded in cap piece 2 so as to form, in effect, an extension of the container body 1. Reciprocable within the shell 4 is a tubular member 5 that constitutes in effect a tubular piston, the member being formed at its inner end with a flange 6 that is normally pressed against an internal shoulder 7 in the shell 4 by means of a compression spring 8.

The spring 8 surrounds a stationary tubular member 9, the outer end of which projects at all times within the bore of tubular piston 5, while its inner end, which is provided with a flanged head 10, rests against a retaining member 11 that has threaded engagement with the upper end of the shell 4 so as to form, in effect, an inwardly projecting continuation thereof. The inner end of the spring 8 presses against the flange on the head 10 and in conjunction with a packing ring 12 insures at all times a close seal between the head and member 11 so that the only communication between container 1 and the interior of tubular member 9 is by way of an opening 13 in the member 11.

This communication is furthermore controlled by means of a check valve in the form of a ball 14 that is normally held against a suitable seat in the head 10 by means of a compression spring 15. Lateral openings 13ª in the member 11 afford free communication at all times between the container 1 and the annular space between the shell 4 and the tubular member 9, in which the spring 8 lies. The outer end of the tubular piston 5 is somewhat reduced in diameter and externally threaded to receive a nozzle 16. The discharge opening 17 of the latter, is externally of flaring or conoidal form, as best shown in Figs. 2, 3 and 4; while a check valve 18 is held normally seated by means of a compression spring 19 against a suitable seat in the end of the tubular piston so as to permit of the discharge of lubricant through the bore of the latter into the nozzle and its emission through the opening 17, but preventing any return flow of lubricant or air. In operation, the container, suitably held in the user's hands, is moved to bring the nozzle 16 into sealing contact with the nipple, presently to be described, and pressure is thereupon exerted on such container longitudinally of its axis or of the axis of the discharge device proper. As a result, the tubular piston 5 is forced inwardly against the spring 8 and, assuming the piston, as well as tubular member 9, to be filled with lubricant, as the result either of priming or of a previous operation, a predetermined amount of lubricant will be forcibly discharged through the nozzle and into the nipple, the amount depending upon the capacity of the tubular piston and the length of its stroke. In the operation just described, the check valve 14 of course closes the inner end of tubular member 9 so as to prevent the return of the lubricant into the body of the container 1. The moment, however, the pressure under which the device has been forced against the nipple is released, the spring 8 expands and thereby forces the tubular piston out again to the position shown in Fig. 1, with the result that a fresh charge of lubricant is drawn in through opening 13 in the member 11, the valve 14 being free to unseat in this direction.

It will be understood, of course, that in order to satisfactorily use a lubricating device of the type described, it is quite essential that a close fitting contact be secured between the nozzle opening and the nipple. Such sealing contact must furthermore be obtainable irrespective of whether the axis of the device, i. e. of the nozzle, coincides with the axis of the nipple for, due to accident or cramped surroundings, the nozzle may be applied in an angular relation to the nipple. Furthermore, the nipple is apt to collect more or less dust and grit and the sealing contact must be effected despite this. The nipple must furthermore be of metal sufficiently hardened to be proof against nicking or abrasion under ordinary circumstances, since, if the contour of its face be broken, it is no longer possible to obtain good sealing contact.

Referring first to the form of my improved nipple shown in Figs. 1 to 4, inclusive, the nipple will be seen to comprise a tubular body 22 that is externally threaded at one end for attachment to the journal or other bearing part to which lubricant is to be supplied. A portion 23 of the body is made of polygonal cross-section so as to facilitate the engagement therewith of a wrench or other tool and the bore in the body is enlarged to form a recess 24 adjacent the corresponding end. A separate teat member 25 having an inner enlarged or flaring end 25ª is seated in the recess and the surrounding metal of the body 22 is forced inwardly over the enlarged end or base, whereby the teat member is firmly attached to the body. The eyeleting operation, whereby member 25 is thus firmly secured to the body portion 22, may be accomplished by spinning, pressing or otherwise, as found best suited for the purpose. The body 22 may be made of relatively soft metal so that it can be fashioned from rod or bar stock on an automatic machine, but the teat member 25 will preferably be stamped up from a strip or sheet of relatively hard metal, or of metal capable of being subsequently hardened, so that the exterior surface of the member will not be affected by any ordinary chance blow nor will it be subject to abrasion or wear under ordinary use. The forward or contact face of member 25 is convexly curved symmetrically about its axis so as to be adapted to fit tightly against the flaring opening 17, whether the latter be of the strictly conical form shown in Fig. 2, or of the convexo-conoidal form shown in Fig. 3, or of the concavo-conoidal form shown in Fig. 4, this irrespective of whether the axes of the nozzle and nipple coincide, as shown in Fig. 1, or are angularly related, as shown in Figs. 2, 3 and 4. The opening 25ᵇ in the end of member 25 will, it should be noted, in all such positions, freely communicate with the opening 17 in the nozzle.

In the form of nipple under consideration, a check valve consisting of a ball 26 is provided, the ball being adapted to seat within the flaring end 24 of teat member 25 and being normally held in seated position by means of a spring 27 that is retained within the bore of body 22 by an integral flange or shoulder 28 formed at the inner end of the bore.

As shown in Fig. 5, the teat member 25 need not be mounted co-axially in the nipple body 22, but the outer end 29 of the latter beyond the polygonal portion 23 may be enlarged and formed with an angularly directed communicating bore recessed at one end to receive the teat member as before, the member here lying at a corresponding angle to the axis of the body 22. In this construction, the check valve 30 and co-operating spring 31 may be contained in the angularly related portion of the bore in the outer end 29 of the nipple body.

Figure 6:
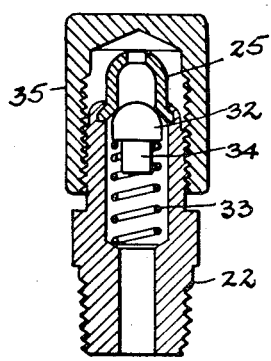

The modification illustrated in Fig. 6 is particularly designed for use on a water pump, or in other situations where the nipple may be interiorly subjected to a heated fluid, and consists in the substitution for a ball valve, such as previously described, of a button shaped valve 32 of fiber that seats against the flaring base of teat member 25 and is held normally thus seated by means of a spring 33, said valve having a short stem 34 around which the spring is fitted. The nipple body 22 is here made somewhat longer and its outer end is externally threaded to receive a cap 35.

Figure 7:
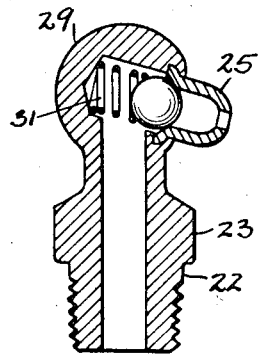

Fig. 7 illustrates a construction in all respects similar to that shown in Fig. 5, except that the angularly related bore in the enlarged end 29 of nipple body 22 is here shown as disposed at an acute instead of an obtuse angle to the bore in the body. The construction shown in Fig. 8 is likewise similar to that shown in Fig. 5, except that the teat member is here provided with a cylindrical extension 36 beyond the flaring portion 37, the open end of the bore in the nipple body, which receives the teat member, being correspondingly elongated.

In place of eyeleting the outer end of the nipple around an enlarged or flaring base on the teat member, the metal may merely be spun or otherwise tightly compresed around the sides of such teat member and the necessity for providing the latter with an enlarged base thus avoided. In this case, however, in order to insure the firm retention of the teat member in the body of the nipple, the member 40, as shown in Fig. 9, is preferably formed with a circumferential groove 41 into which the metal of the body is thus forced.

Figure 8:
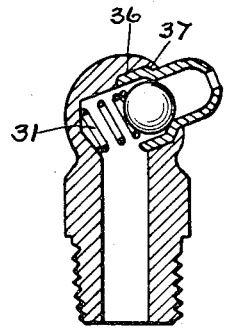
Figure 9:
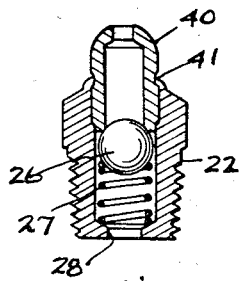
Figure 10:
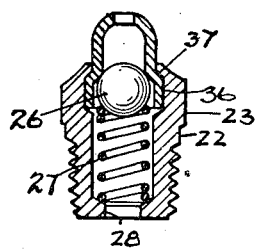
Figure 11:
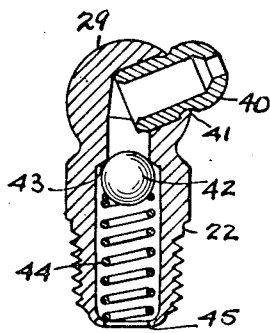

In Fig. 10 is shown the adaptation of the form of teat member illustrated in Fig. 8 to a nipple body with a straight bore, similar to that shown in Figs. 1 to 4, inclusive; while in Fig. 11 there is shown the combination with a nipple body having an angularly related bore in an enlarged end 29, as in Figs. 5 and 8, of a teat member 40 having circumferential groove 41, as shown in Fig. 9. In Fig. 11, moreover, instead of the check valve 42 seating against the inner end or base of the teat member, the main bore in body 22 is formed with a seat 43, against which the ball is pressed by means of a spring 44 that is held in place by an inturned flange 45 at the inner end of the body. In order to assemble the parts in this construction, it will of course be necessary to form such flange 45 after the valve and spring are in place, whereas in the several previously described constructions, the preferred method of assembling such parts is from the opposite end, the teat member being last secured in place.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a nipple designed for automatic sealing contact with a nozzle, the combination of a tubular body; and a separate end-member of relatively harder metal firmly secured in one end of said body by eyeleting.

2. In a nipple designed for automatic sealing contact with a nozzle, the combination of a tubular body, the bore in said body being enlarged to form a recess adjacent one end of the latter; and a separate end-member having an inner, enlarged end seated in such recess, the surrounding portion of said body being forced inwardly over such enlarged end, whereby said end-member is firmly attached to said body.

3. In a nipple designed for automatic sealing contact with a nozzle, the combination of a tubular body; a separate end-member firmly secured in one end of said body; and a valve-member within the bore of said body adapted to seat against the inner end of said end-member.

4. In a nipple designed for automatic sealing contact with a nozzle, the combination of a tubular body; a separate end-member firmly secured in one end of said body; a valve member within the bore of said body adapted to seat against the inner end of said end-member; and a spring within said body tending normally thus to seat said valve-member, the end of the bore in said body opposite said end-member being formed to retain said spring in place.

5. In a nipple designed for automatic sealing contact with a nozzle, the combination of a tubular body; a separate end-member firmly secured in one end of said body; a valve member within the bore of said body adapted to seat against the inner end of said end-member; and a spring within said body tending normally thus to seat said valve-member, the end of the bore in said body opposite said end-member being of reduced diameter, whereby a shoulder is formed for said spring to press against.

6. In a nipple designed for automatic sealing contact with a nozzle, the combination of a tubular body externally threaded at one end for attachment to another part and having a portion of polygonal cross-section; a separate end-member firmly secured in the other end of said body; and a valve-member within the bore of said body adapted to seat against the inner end of said end-member.

7. In a nipple designed for automatic sealing contact with a nozzle, the combination of a tubular body externally threaded at one end for attachment to another part and having a portion of polygonal cross-section, the bore in said body being enlarged to form a recess adjacent the other end thereof; and a separate end-member having an inner, flaring end seated in such recess, the surrounding portion of said body being forced inwardly over such inner-end, whereby said end-member is firmly attached to said body.

8. In a nipple designed for automatic sealing contact with a nozzle, the combination of a tubular body externally threaded at one end for attachment to another part and having a portion of polygonal cross-section, the bore in said body being enlarged to form a recess adjacent the other end thereof; a separate end-member having an inner, enlarged end seated in such recess, the surrounding portion of said body being forced inwardly over such enlarged-end, whereby said end-member is firmly attached to said body; and a valve-member within the bore of said body adapted to seat against such enlarged end.

9. In a nipple designed for automatic sealing contact with a nozzle, the combination of a tubular body externally threaded at one end for attachment to another part and having a portion of polygonal cross-section, the bore in said body being enlarged to form a recess adjacent the other end thereof; a separate end-member having an inner, flaring end seated in such recess, the surrounding portion of said body being forced inwardly over such end, whereby said end-member is firmly attached to said body; and a valve-member within the bore of said body adapted to seat within such flaring end, the end of the bore in said body opposite said end-member being of reduced diameter, whereby a shoulder is formed for said spring to press against.

10. In a nipple designed for automatic sealing contact with a nozzle, the combination of a body having an axial bore, and a separate member of harder material than said body set into said bore and fastened in place.

In testimony whereof, I have hereunto signed my name this 1st day of April, 1924.

OSCAR U. ZERK.